No. 769,708.  Patented September 13, 1904.

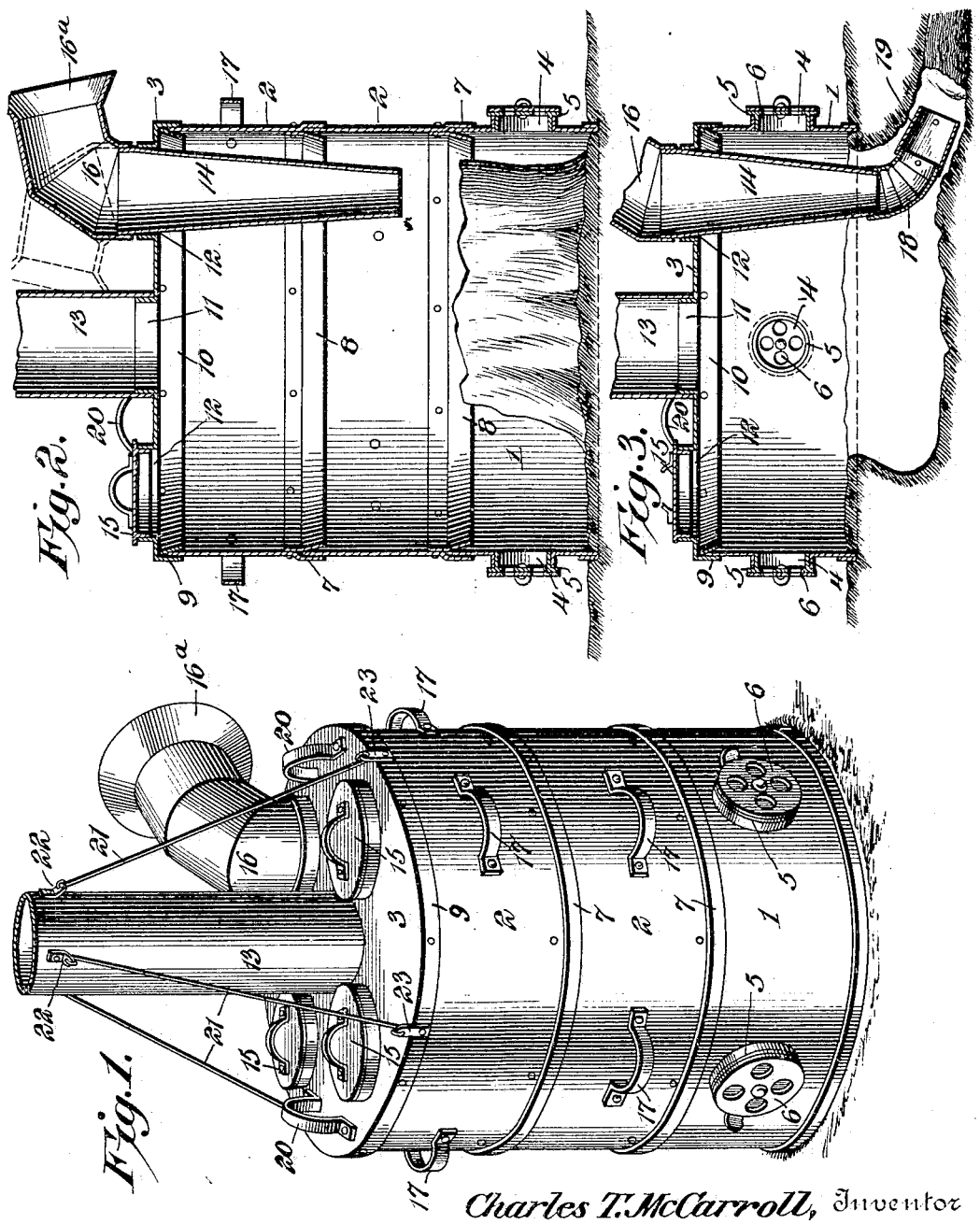

UNITED STATES PATENT OFFICE.

CHARLES T. McCARROLL, OF OTTUMWA, IOWA.

STUMP-BURNER.

SPECIFICATION forming part of Letters Patent No. 769,708, dated September 13, 1904.

Application filed March 25, 1904. Serial No. 199,998. (No model.)

*To all whom it may concern:*

Be it known that I, CHARLES T. MCCARROLL, a citizen of the United States, residing at Ottumwa, in the county of Wapello and State of Iowa, have invented a new and useful Stump-Burner, of which the following is a specification.

The invention relates to improvements in stump-burners.

The object of the present invention is to improve the construction of stump-burners and to provide a simple and comparatively inexpensive one adapted to be readily set up around the stump and capable of effectively burning both dry and green stumps.

A further object of the invention is to provide a stump-burner adapted to burn a stump and its large roots for a distance of several feet beneath the surface of the soil to clear land and prevent the roots from interfering with a plow or other cultivating device.

The invention also has for its object to provide means for directing a blast of air upon a stump and to enable the same to be readily extended and arranged in the desired direction for consuming the larger roots.

With these and other objects in view the invention consists in the construction and novel combination and arrangement of parts, hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a stump-burner constructed in accordance with this invention. Fig. 2 is a vertical sectional view of the same. Fig. 3 is a similar view, the upper sections of the casing being removed and the air-blast tube being extended for burning a root.

Like numerals of reference designate corresponding parts in all the figures of the drawings.

1 and 2 designate cylindrical sections of an extensible casing which is composed of the bottom section 1 and a plurality of upper sections 2, which may be of any desired number to secure a casing of the desired height, and as the sections 2 and a cover 3 are of the same diameter one or more sections may be used, and the cover may be arranged upon one of the upper sections 2, as illustrated in Figs. 1 and 2 of the drawings, or upon the bottom section 1, as illustrated in Fig. 3. The section 1 is designed to be arranged upon the ground and around the stump, as illustrated in Fig. 2 of the drawings, and in practice the ground will be leveled or a slight trench will be dug to receive the lower section. The lower edge of the lower section is designed to be partially embedded in the ground to provide an air-tight connection at the bottom to prevent air from entering at that point and interfering with the draft of the stump-burner. The bottom section is provided with a plurality of draft-openings 4, preferably flanged, as shown in Figs. 2 and 3, and provided with caps or covers 5, which may be fitted within or around the flanges of the bottom section or provided with rotary dampers or cut-offs 6, having openings adapted to register to a greater or less degree with corresponding openings of the caps and to be carried out of register for controlling the draft. These draft-openings are mainly employed while the stump-burner is drying a green stump.

The sections 2 are provided at their lower edges with annular grooves to receive the upper edges of the contiguous sections, the grooves being preferably formed by flaring the lower edges 7 of the sections 2 outward slightly and by providing an interiorly-arranged flange or ring 8 to coöperate with the lower edges 7. The flange or ring is riveted or otherwise secured to its section 2, and its lower portion is crimped or contracted to provide a tapering annular groove or space between it and the lower edge of the section, whereby the upper edge of the contiguous section may be fitted tightly within the groove. By this construction an air-tight joint or connection between the sections is provided. The cap, which is provided with a depending interiorly-arranged flange 9, also has an interiorly-arranged flange or ring 10, coöperating with the flange 9 to form a tapering groove to receive the upper edge of the contiguous section.

The cover or top of the casing is provided with a plurality of openings 11 and 12, having upwardly-extending annular flanges. These openings are preferably arranged as shown in Fig. 1, the opening 11 being located at the center of the top or cover and the opening 12 being arranged around the same. Any number of these openings may be provided, and they are of the same diameter. The central opening receives a smoke stack or pipe 13, and the other openings are adapted to permit an air-blast pipe or tube 14 to be arranged in the desired position for burning a stump or the roots thereof. The top openings 12 not in use are covered by caps or closures 15. The air-blast pipe or tube 14 is tapering, as shown, and it is preferably provided with an exteriorly-arranged hood 16, consisting of a large elbow or section having a flaring mouth 16ª, adapted to be turned to receive any wind that may be blowing, whereby the current or blast of air is increased. A plurality of these air-blast tubes or pipes may be simultaneously used, according to the size of the stump, and in burning a dry stump the fuel is placed around the stump, being introduced through the top openings of the stump-burner, and as soon as the stump is ignited the blast of air direct upon the same will cause the stump to be rapidly consumed. As the stump is consumed the sections of the casing may be reduced in number, and to facilitate the same they are provided at opposite sides with handles 17.

The air-blast tubes may be of different lengths, and they are provided at their lower reduced ends with elbow-sections 18 and straight sections 19, which may be of any desired number and which may be readily turned in the desired direction for directing the blast of air upon a root, whereby the large roots of a stump may be consumed for a distance of several feet beneath the surface of the ground in the manner indicated in Fig. 3 of the drawings.

When it is desired to burn a green stump, it is first dried by burning fuel around the stump and within the casing until the stump takes fire. The bottom draft-openings are employed for controlling the draft while the stump is being dried. As soon as the stump is thoroughly dried and begins to burn one or more of the air-blast tubes are placed in position, and the stump will then be consumed without the use of any more fuel.

The cover or top of the casing is also provided with opposite handles 20 for enabling it to be readily removed from and replaced on the casing. The smoke-pipe 13 may be supported by a plurality of wire stays or braces 21, detachably engaging perforated ears or flanges 22 and 23 of the smoke-pipe and the top or cover.

It will be seen that the stump-burner is exceedingly simple and inexpensive in construction, that the extensible casing may be quickly set up over a stump, and that both a green and dry stump may be effectively consumed. Also it will be clear that the stump-burner is adapted to consume a stump and its roots for a distance of several feet beneath the surface of the ground and that the large roots may be followed up and consumed for some distance from the stump.

Having thus fully described my invention, what I claim as new, and desire to secure by Letters Patent, is—

1. A stump-burner, comprising a casing provided at the top with a plurality of openings, a smoke-pipe extending upward from one of the openings, and an extensible air-blast tube depending from one of the openings of the top or cover and adapted to direct a current of air upon a stump or root and to be extended as the same is consumed, substantially as described.

2. A stump-burner, comprising a casing composed of a plurality of sections of the same diameter detachably fitted together, whereby one or more of the sections may be used, the bottom section being provided with draft-openings having means for controlling the draft, a top or cover provided with a plurality of openings, a smoke-pipe extending upward from one of the openings, and a removable extensible air-blast tube depending from one of the openings of the top or cover, substantially as described.

3. A stump-burner, comprising a casing open at the bottom and adapted to be placed around a stump, and an extensible air-blast tube depending from the top of the casing for directing a current of air upon a stump and its roots, substantially as described.

4. A stump-burner, comprising a casing adapted to be placed around a stump, an air-blast tube depending from the top of the casing for directing a current of air upon a stump and its roots, and an exteriorly-arranged approximately L-shaped hood fitted on the air-blast tube, substantially as described.

5. A stump-burner, comprising a casing adapted to be placed around the stump and provided at the top with an aperture, a tapering air-blast tube fitted within the opening and depending from the top of the casing, and a plurality of adjustable sections connected with the lower end of said tube for directing the air against a stump and its roots, substantially as described.

6. A stump-burner, comprising an extensible casing composed of sections, and provided with a cap having a plurality of openings, a smoke-pipe connected with one of the openings, a depending air-blast tube fitting within one of the openings of the top or cover, a plurality of sections connected with the lower end of the air-blast tube, and an exteriorly-arranged hood connected with the upper end of the tube, substantially as described.

7. A stump-burner, comprising a casing having an aperture at the top, and an air-blast tube extending through the opening and capable of rotation to turn the same in the direction of the wind, and depending from the said top to direct a blast of air against a stump or root, substantially as described.

8. A stump-burner, comprising a casing provided with an aperture, and an air-blast tube extending through the aperture of the casing to direct a blast of air against a stump or root and provided at its top with a hood, said air-blast tube being capable of rotation to turn the hood in the direction of the wind, substantially as described.

9. A stump-burner, comprising a casing, and an air-blast tube piercing the casing and provided with extensible sections, said air-blast tube being revoluble to turn it in the direction of the wind, and the sections being capable of independent adjustment to direct the air against a stump and its roots, substantially as described.

10. A stump-burner, comprising a casing open at the bottom and adapted to be placed around a stump, and an air-blast tube extending into the casing and arranged to direct a current of air upon a stump or root.

In testimony that I claim the foregoing as my own I have hereto affixed my signature in the presence of two witnesses.

CHARLES T. McCARROLL.

Witnesses:
E. A. SHEAFE,
W. W. EPPS.